Nov. 19, 1957 W. H. BERCH 2,813,930

TERMINATION FOR TWO-WAY TRUNK CIRCUIT

Filed Dec. 6, 1954 8 Sheets-Sheet 1

INVENTOR.
WILLIAM H. BERCH

BY [signature]

AGENT

TERMINATION FOR TWO-WAY TRUNK CIRCUIT

Filed Dec. 6, 1954 8 Sheets-Sheet 2

INVENTOR.
WILLIAM H. BERCH
BY Henry H. Gage
AGENT

Nov. 19, 1957 W. H. BERCH 2,813,930

TERMINATION FOR TWO-WAY TRUNK CIRCUIT

Filed Dec. 6, 1954 8 Sheets-Sheet 3

INVENTOR.
WILLIAM H. BERCH

BY

Henry H. Gage
AGENT

TERMINATION FOR TWO-WAY TRUNK CIRCUIT

Filed Dec. 6, 1954 8 Sheets-Sheet 4

INVENTOR.
WILLIAM H. BERCH
BY Henry H. Gage
AGENT

INVENTOR.
WILLIAM H. BERCH
BY Henry H. Gage
AGENT

TERMINATION FOR TWO-WAY TRUNK CIRCUIT

Filed Dec. 6, 1954 8 Sheets-Sheet 6

INVENTOR.
WILLIAM H. BERCH
BY Henry H. Page
AGENT

INVENTOR.
WILLIAM H. BERCH
BY Henry H. Gage
AGENT

Nov. 19, 1957 W. H. BERCH 2,813,930

TERMINATION FOR TWO-WAY TRUNK CIRCUIT

Filed Dec. 6, 1954 8 Sheets-Sheet 8

INVENTOR.
WILLIAM H. BERCH

BY Henry H. Gage

AGENT

United States Patent Office 2,813,930

Patented Nov. 19, 1957

2,813,930

TERMINATION FOR TWO-WAY TRUNK CIRCUIT

William H. Berch, Penfield, N. Y., assignor, by mesne assignments, to General Dynamics Corporation, a corporation of Delaware Application December 6, 1954, Serial No. 473,189

13 Claims. (Cl. 179—27)

This invention relates to telephone systems in general and more particularly to terminations at a private branch exchange suitable for use in connection with trunks from a central office.

In the past, it has been the practice in telephone systems comprising a private branch exchange and a central office which are interconnected by means of trunks to provide means at the central office for preventing the extension of connections dialed from stations associated with the private branch exchange to certain destinations at the central office, such as a toll board. While such devices accomplish the destination-restricting function in a satisfactory manner, central office line circuits equipped to prevent such connections offer a number of disadvantages, one of which is the requirement of special, complex apparatus located at the central office to work in conjunction with the regular line terminating equipment associated with lines to private branch exchanges.

Accordingly, it is an object of this invention to provide a new and improved means for terminating interoffice trunks.

Another object of my invention is to provide a trunk termination in a first office through which calls may be extended from stations in the first office to certain destinations in the second office, and which is effective to prevent the extension of calls from the first office stations to certain other destinations in the second office.

Another object of my invention is to provide in a first office a termination having an incoming signaling means operated in a first manner to indicate an incoming call on the associated trunk circuit from a second office, and in a second manner to indicate that an attempt is being made to extend a connection from a station in the first office to a restricted destination in the second office.

Another object of my invention is to provide an improved supervisory arrangement for feeding battery to a calling telephone connected to a trunk termination and for operating a supervisory lamp in an operator position to which a connection may be extended from the trunk termination.

In order to accomplish the foregoing objects, I provide in the preferred embodiment of my invention a telephone system comprising a first private branch exchange office and a second central office. The first office includes an operator position, a termination suitable for terminating a trunk to the central office, a station telephone associated with the private branch exchange, and means for extending a connection from the telephone to the termination in the case of calls from the station to the central office. The central office includes means operative to extend calls from the private branch exchange responsive to seizure of the trunk at the first office, and other means operative to seize the trunk in the case of incoming calls from the central office to the private branch exchange. The termination at the private branch exchange includes incoming signaling means, means responsive to seizure of the trunk by the central office for energizing the incoming signaling means, means for repeating directive signals from the telephone to the trunk, registering means responsive to the repeating means, and discriminating means.

The equipment in the termination is arranged so that in the case of calls incoming to the private branch exchange from the central office the termination signal responsive means is effective to energize the incoming signaling means at the operator position in a first manner, as, for example, by steady energization. In the case of outgoing calls from the station to the central office the registration means is operative responsive to destination-indicating signals to the central office as they are repeated at the termination and is effective when the signals are of a particular value to cause the discriminating means to energize the incoming signaling means in a second particular manner, as, for example, by intermittent or flashing energization, to render the repeating means thereafter inoperative, and to cause the trunk to be released and then reseized. In the event that the signals from the calling private branch exchange station indicate a nonrestricted level, the registering means is held operated until the connection is released; the discriminating means is thereafter inoperative responsive to the receipt of subsequently repeated signals which originate at the private branch exchange station.

The termination is also equipped with means responsive to the registration of a signal of a certain other destination-indicating signals for causing the registering means to be cleared and for making the registering means effective to register the value of the next repeated signal which originates at the station in the private branch exchange. This feature is included to provide for the case where a particular level of a first selector at the central office is not assigned for use and the selector is designed to cancel such digits by any one of a number of well known methods to prevent users of telephone stations in the private branch exchange from defeating the purpose of the restricting means by dialing a first, canceled central office level to render the discriminating means inoperative and then subsequently sending restricted level signals to the central office and thereby extend a connection to a restricted destination.

The operator position is equipped with a cord circuit which includes a supervisory relay comprising first and second balanced feed coils; the latter are suitable to supply current to a telephone such as any of the subscriber telephones associated with the private branch exhange system. A similar line relay is supplied for the same purpose in the termination. The supervisory and line relays are arranged so that the corresponding windings of each relay are placed in series with the exchange battery at the private branch exchange when a call is extended between the operator position and the central office by inserting the plug of the cord circuit into the jack associated with the trunk termination. The discriminating means is further arranged to reverse the connection of the windings between the relays responsive to the registration of a restricted level signal, so that each winding of one of the relays is placed in parallel with one of the windings on the other relay, and the combination is placed in series with the calling station telephone to supply talking current to the telephone at the same time that the relays are held in operated condition.

These and further objects of my invention will be more apparent when considered in connection with the following description and the accompanying drawings arranged as shown in Fig. 11 in which:

Fig. 1 illustrates a system embodying my invention;

Fig. 2*a* shows a skeletonized form of an attendant's cord circuit at an operator position suitable for use in the private branch exchange;

Fig. 2*b* shows a block diagram of switching apparatus at the private branch exchange;

A brief description of the telephone system in which my invention is embodied is next given.

Figure 1:
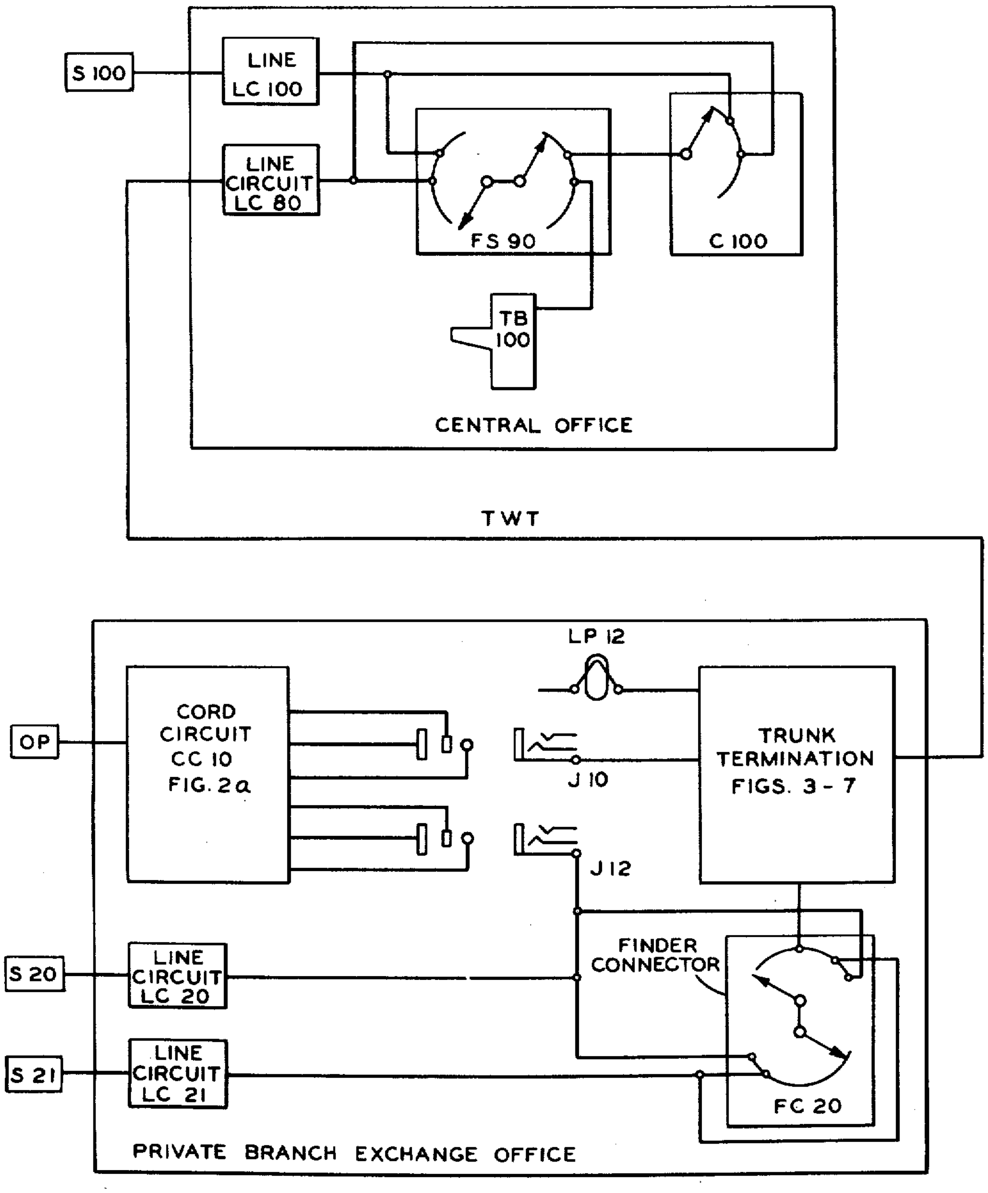
Figure 11:
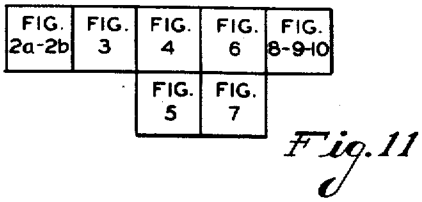

A first office, which may be a private branch exchange office, is connected to a second office, which may be a central office by a two-way trunk TWT as shown in Fig. 1. In the case of a call incoming to the private branch exchange over the trunk TWT, assume that a subscriber such as S100 desiring to extend a connection has operated the central office means for seizing trunk TWT by removing the station telephone from its hookswitch and dialing a connection through the seizing means comprising step-by-step central office switching equipment which includes connector C100 to seize and extend a connection to line circuit LC80 and trunk TWT which is terminated on line circuit LC80. Signal responsive means in the termination at the private branch exchange of trunk TWT is thereupon energized by suitable ringing means in connector C100 to cause means comprising a signaling lamp, such as LP12, associated with the private branch exchange to be energized in a first, steady manner to indicate to the attendant at the operator position that an incoming call is standing in on the trunk. To answer such a call the operator thereafter inserts a plug of the position cord circuit in the incoming jack J10 to extend the connection from station S100 to the operator's telephone OP in Fig. 1. The supervisory relay associated with the plug inserted in jack J10 of cord circuit CC10 is arranged so that each of its balanced windings are placed in series with a corresponding winding of the balanced line relay in the termination by means comprising the talking conductors of cord circuit CC10 and so that each of the resulting series connections is also in series with the private branch exchange office battery. As a result, both the line and supervisory relays are maintained in operated condition.

After determining the requirements of the calling station, the operator may terminate the call or extend it to one of the private branch exchange substations such as S20 by inserting the other plug of the cord circuit in the multiple appearance of the subscriber's line comprising jack J12 in the well known manner.

Figures 2A, 2B:
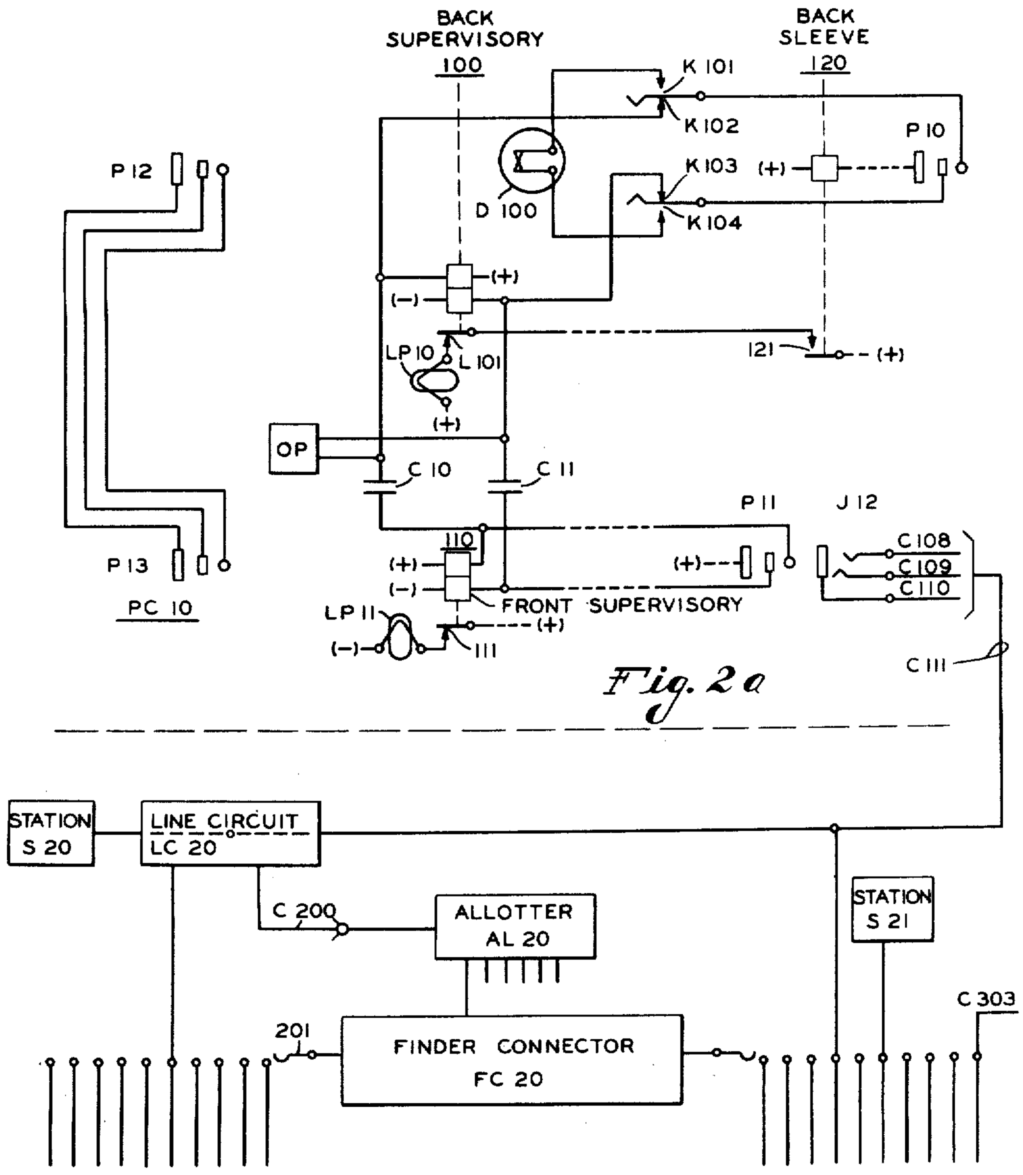
Figure 3:
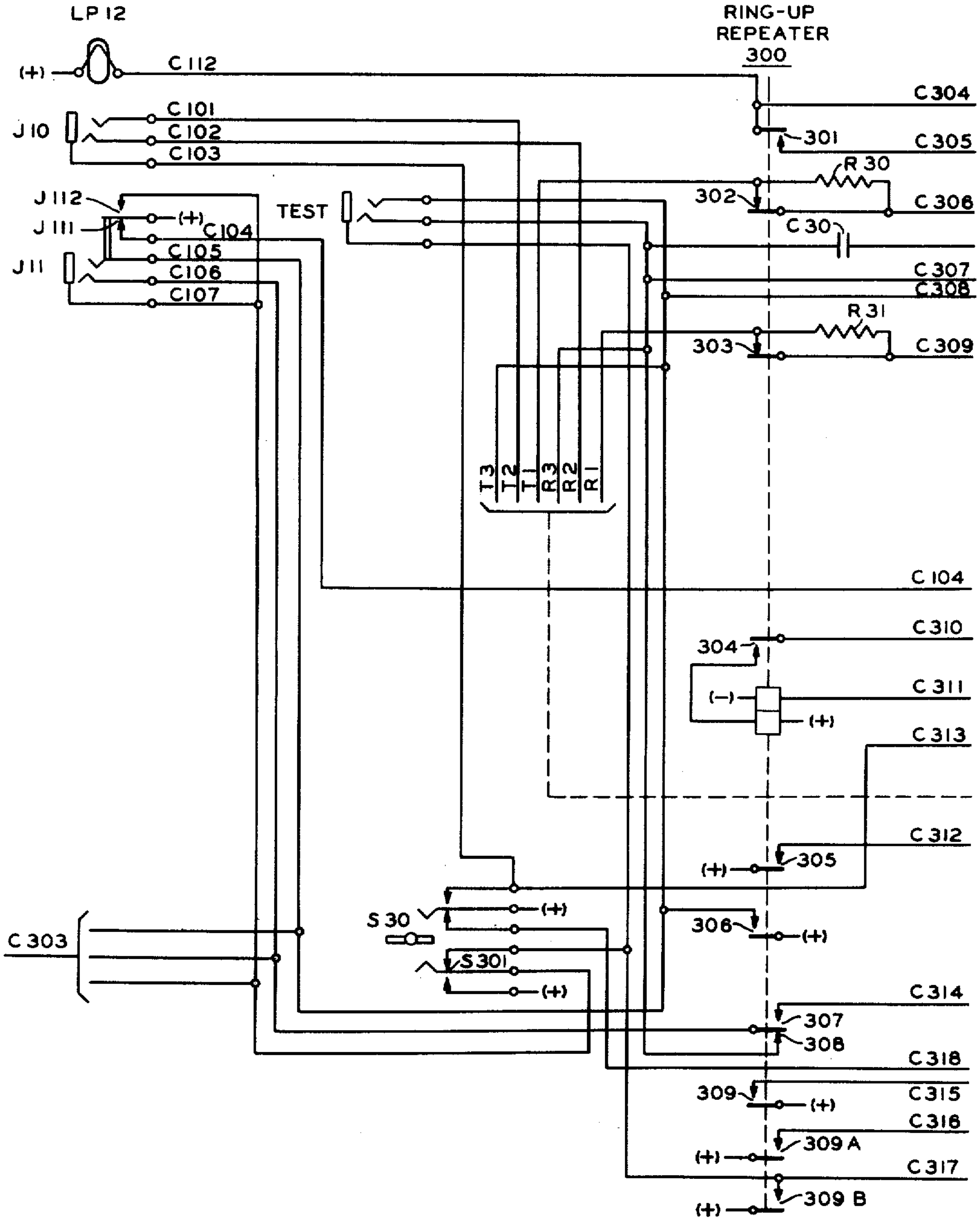
Figs. 3 to 7 show a trunk termination suitable for terminating the private branch exchange end of a two-way trunk TWT, which extends between the first, private branch exchange office and the second, central office.
Figure 4:
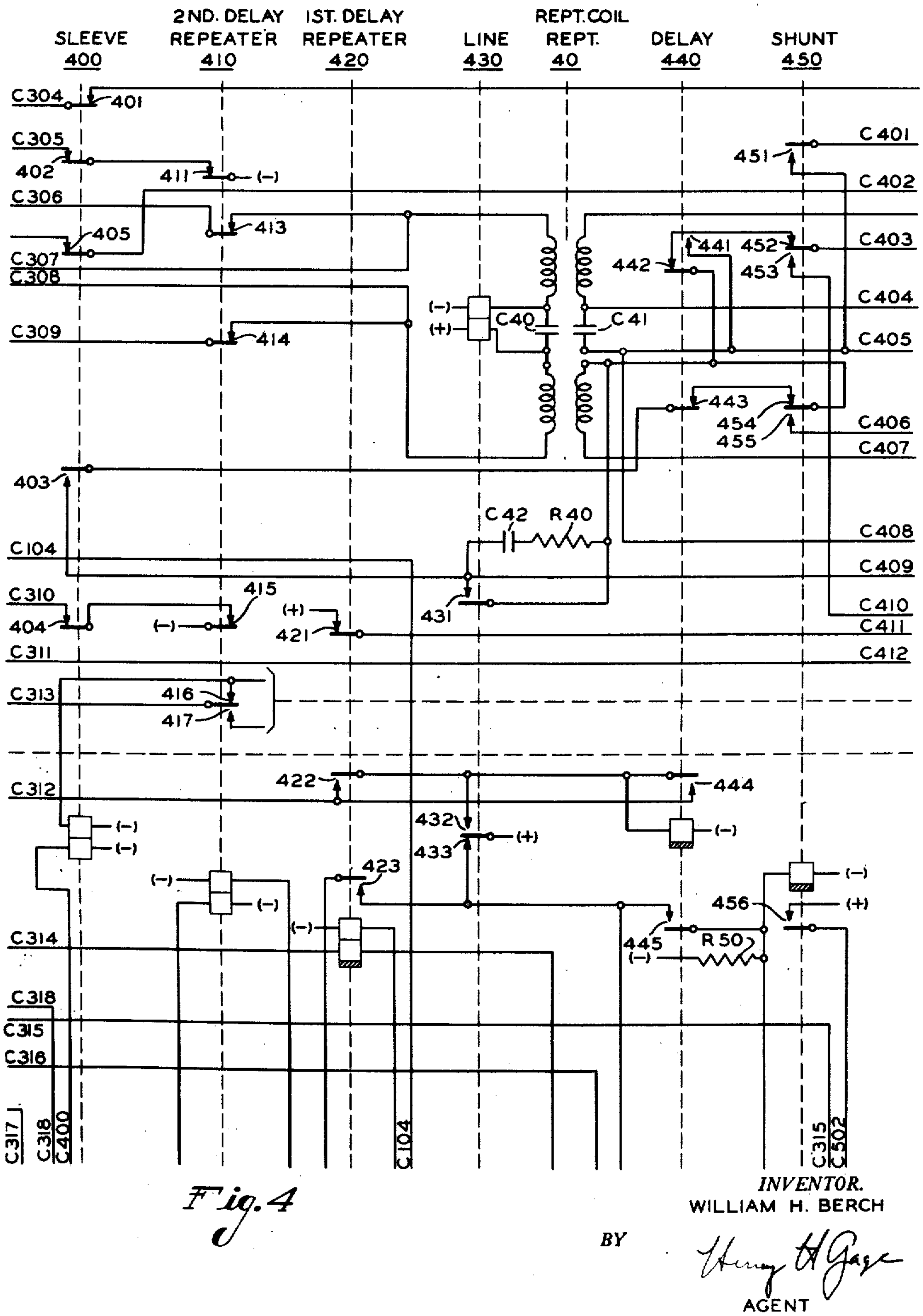
Figure 5:
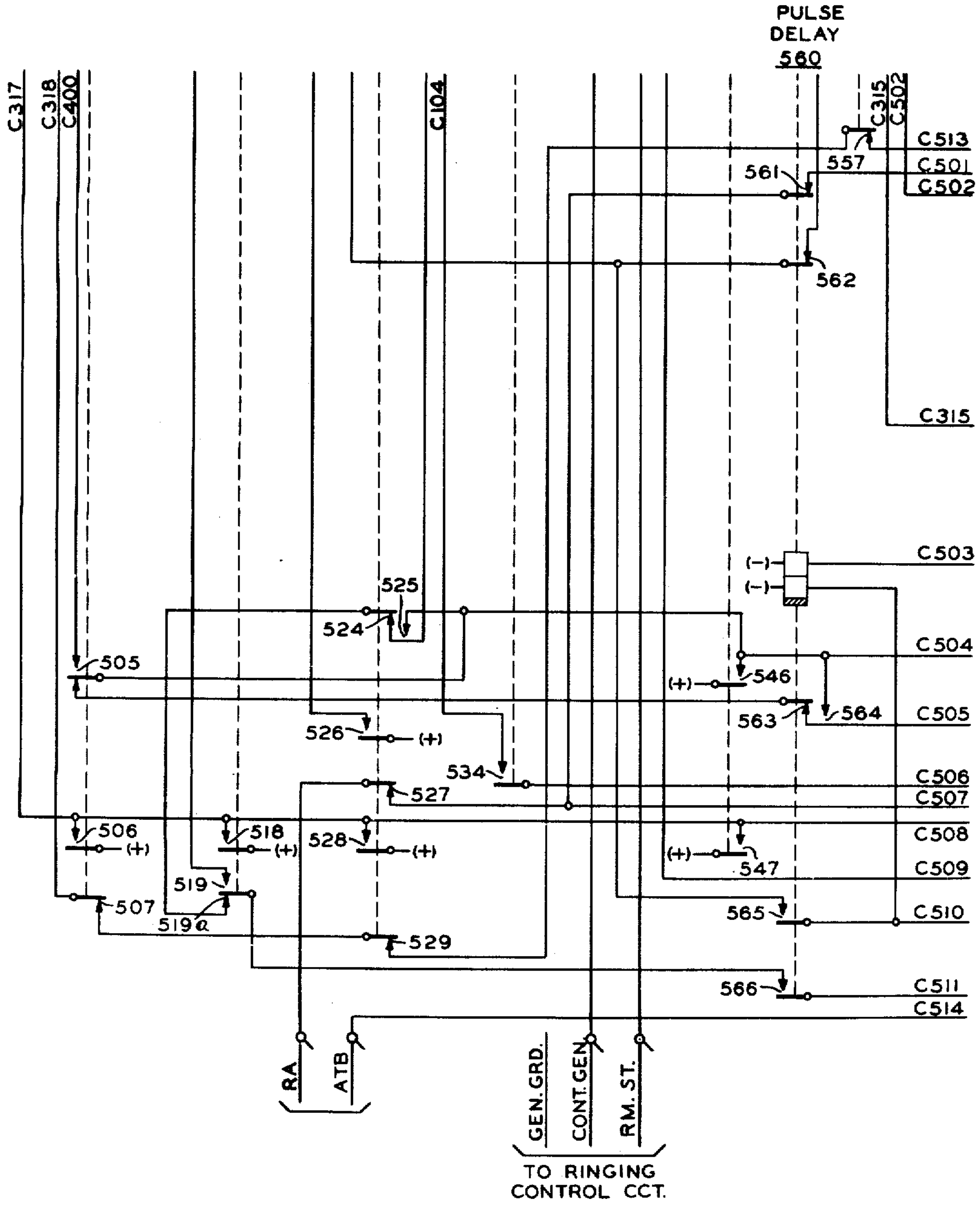
Figure 6:
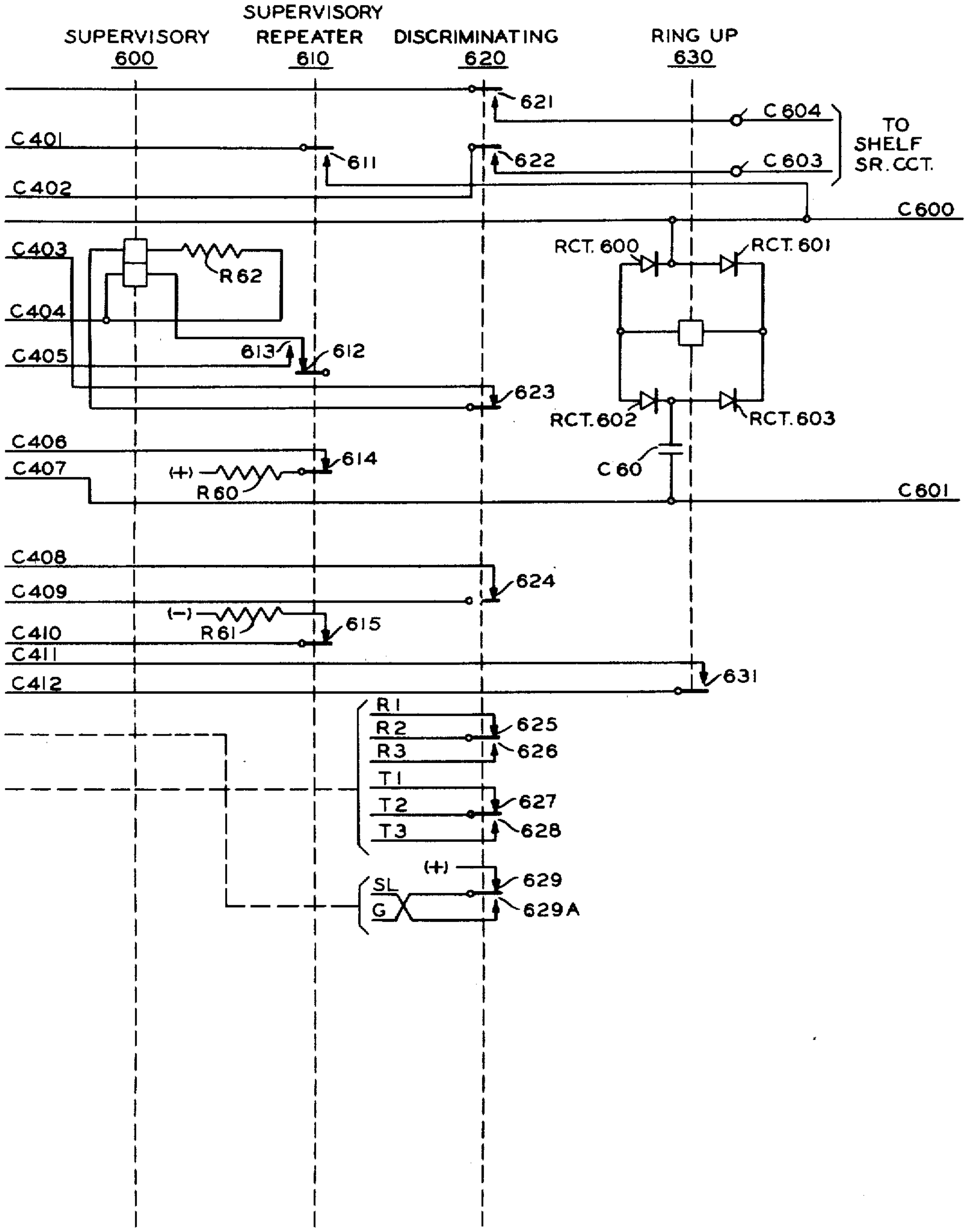

The private branch exchange, such as the one shown in block form in Fig. 2*b*, comprising stations S20 and S21, line circuit LC20, and finder-connector links such as FC20 of the well known step-by-step type, may be operated in the well known manner to extend a call from any one of the stations such as S20 to the private branch exchange termination of trunk TWT by removing the station telephone from its hookswitch to energize the station's line circuit LC10 and thereby cause an idle finder-connector link such as FC20 to establish a connection between the calling station and the finder-connector FC20. Finder-connector FC20 is thereafter operative under the control of a signaling device comprising a dial (not shown) at station S20 in the well known manner to direct the connector switch of finder-connector link FC20 to the level in which the terminations, which are used to terminate interoffice trunks such as TWT, appear. The switch is then caused to automatically hunt for and cut through to the first idle termination in the well known manner. Following the cut through operation, the termination is seized and signal repeating means comprising a line relay is operated and is thereafter under the control of the calling station S20. Other means responsive to operation of the signal repeating means in the termination seizes trunk TWT and thereby causes the energization of central office line circuit LC80. Energization of line circuit LC80 is effective to cause an idle finder-selector link such as FS90 to extend a connection from trunk TWT to the selector portion of the finder-selector link. The central office link switches are thereafter responsive to switch directing signals from the dial at station S20 repeated by the repeating means at the private branch exchange termination of trunk TWT.

Such a directive signal from the repeating means in the private branch exchange termination is transmitted over trunk TWT to direct the selector of finder-selector link FS90 in its primary direction to the level represented by the value of the signal. The selector switch is then automatically advanced in its secondary direction to seize an idle set of terminals within the level. If the extension of the call to its destination such as station S100 in the central office requires that other switches, such as connector C100, be used, further directive signals from station S20 are repeated at the private automatic branch exchange termination and transmitted to the switches to be advanced in the above described manner.

To prevent the extension of calls from a station in the private branch exchange to certain particular destinations which are accessible from the finder-selector link FS90, such as trunks to the toll board TB100, all of which appear in a particular level or levels of the selector switch bank, registering means comprising a minor switch and discriminating means comprising a relay are provided to register the value of the first switch directive signal repeated by the repeating means of the private branch exchange termination of trunk TWT and to release the trunk TWT and the central office connection, respectively. Both the registering and releasing means are arranged so that, responsive to the registration of a signal of the value which represents a level in the selector switch FS90 in which the restricted trunks appear, the discriminating means in the termination is operative to release the finder-selector link FS90 and to render the repeating means inoperative to further directive signals from station S20.

Responsive to the operation of the discriminating means, the incoming signal lamp LP12 in front of the operator is energized in a second, flashing manner to indicate that a call is being intercepted. The operator responds by inserting the plug of cord circuit CC10 into the jack J10. The discriminating means is effective to reverse the previously described connection of the supervisory relay associated with the plug to the termination line relay so that the battery and ground windings of both relays are in parallel and connected to the calling telephone to supply talking current to the transmitter of the latter and to cause both relays to be held operated responsive to the flow of such current.

Following the registration of a switch directing signal of a value which represents a level in the selector switch of finder-selector FS100 to which stations of the private branch exchange are allowed access, the registration means is left in its operated condition, so that the discriminating means is ineffective as the remainder of the central office switch directing signals are repeated at the private branch exchange trunk termination. The registering means remains in this uncleared condition until the termination is released by second releasing means actuated by the return of the calling station telephone to its hookswitch.

The registering means is also arranged to energize first releasing means to clear the registration means in the event the value of the signal registered represents a level in the central office selector switch which is unused and which is to be canceled upon receipt by well known means in the finder-selector link FS90. Following the operation of the first releasing means, the registering means is rendered effective to register the value of the next succeeding directive signal from station S20.

During the time that the operator position shown in Fig. 1 is unattended, calls extended from stations such as S100 in the central office to the operator position of the private branch exchange may be further extended to particular stations in the private branch exchange such as S20 by means of patching cords PC10 inserted into the night service jack J11 and the subscriber's multiple appearance jack J12. Means associated with the night service jack J11 and operative responsive during the time that a plug is inserted in the night service jack in the above-mentioned manner is effective to render the previously described registering and discriminating means inoperative, so that calls extended from a private branch exchange station to the central office by means of finder-connector link FC20 in the previously described manner may thereafter be extended to the previously restricted levels of the finder-selector link in the central office switch train.

Figure 7:
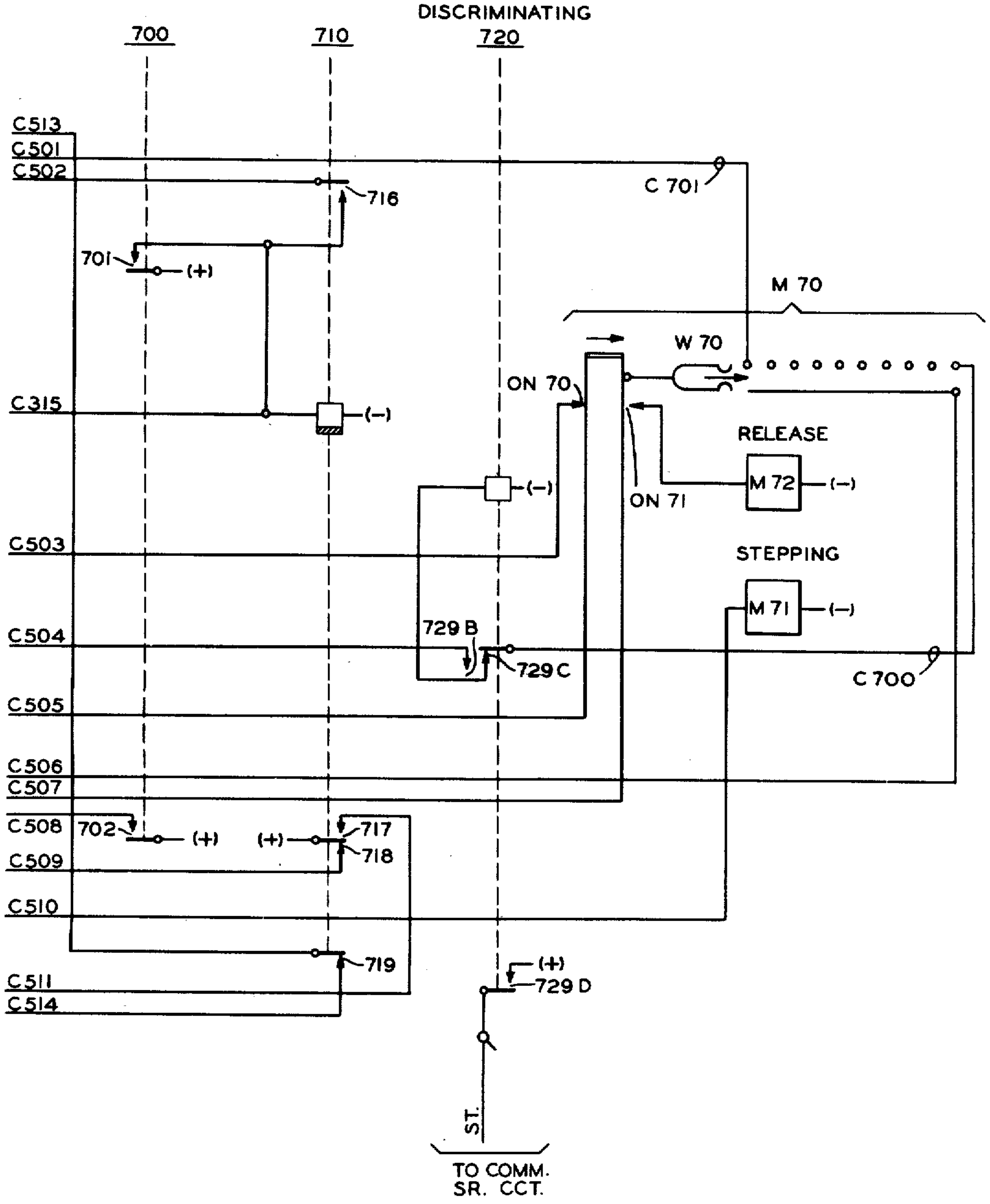
Figures 8, 9, 10:
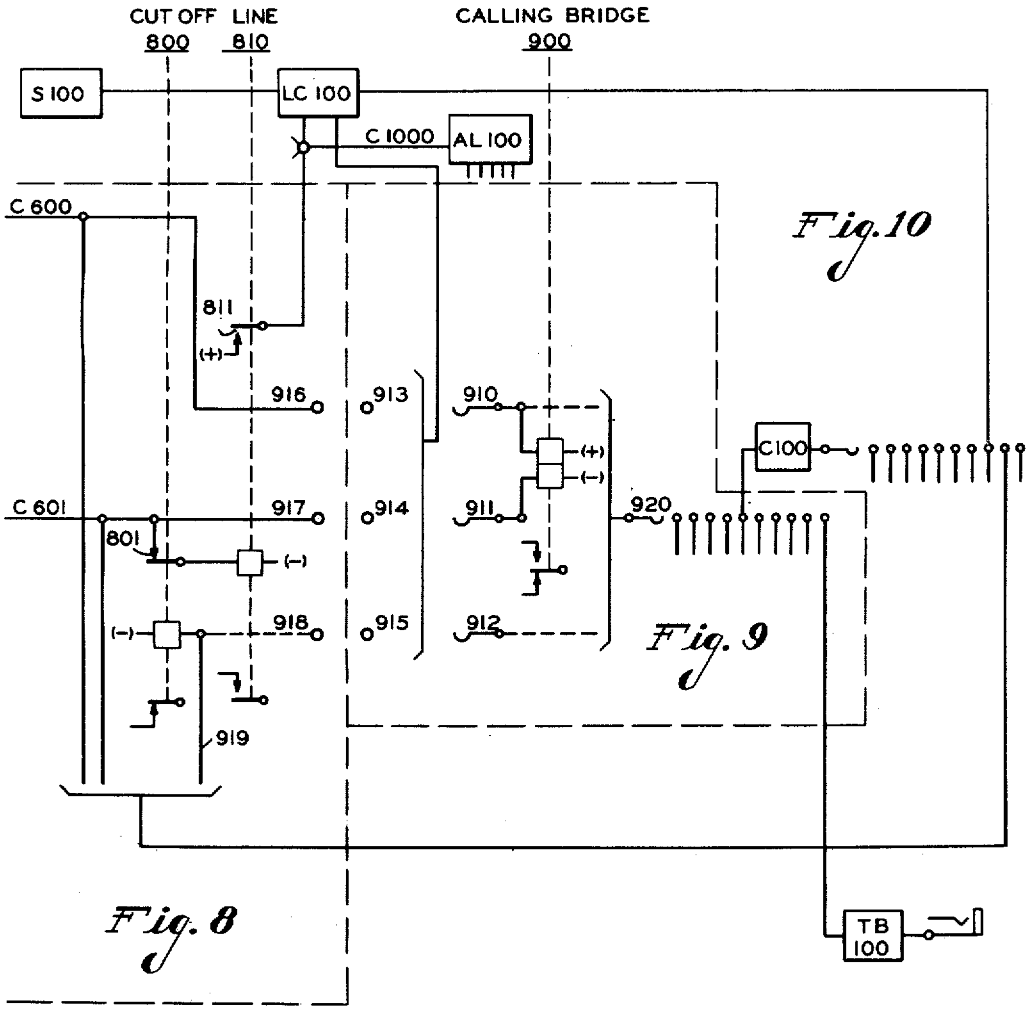
Figs. 8 and 9 show skeletonized forms of the line and first selector switching equipment, respectively, in the central office; and, Fig. 10 shows a block diagram of a connector circuit, a line circuit LC100 and a station S100 suitable for use with central office switching equipment.

As mentioned previously, the switching apparatus at the central office shown in Figs. 8, 9 and 10 functions in the well known step-by-step manner. In the detailed description which follows, this equipment is described only insofar as it pertains to the operation of the trunk terminations shown in Figs. 3–7 in which the invention lies.

The apparatus and description which follows is designed to operate from batteries in each of the private branch exchange and central offices having a nominal potential of 48 volts. The most positive plate of each battery is conventionally connected to ground, and connections to this terminal are referred to in the following description as "ground" and symbolically as (+). Similarly, connections to the most negative, ungrounded plate, are referred to as "battery" and symbolically as (−). During the interval that the operator position at the private branch exchange is unattended, a night service battery key is operated to remove the connection to battery from certain points which are referred to as "night switching battery" and which are represented in the drawing by the symbol (−).

*Detailed description*

*Extension of a call from central office station S100 to private branch exchange station S20.*—To originate a call, the telephone at station S100 is removed from its hookswitch thereby energizing line circuit LC100 which in turn closes ground on the start lead C1000 of common allotter AL100 to energize the allotter. Responsive to the energization of allotter AL100, the finder switch of an idle finder-selector link, such as FS90, is operated in its primary and secondary directions to advance wipers 910, 911 and 912 to terminals 913, 914 and 915, respectively, of the calling line in the finder multiple. Such operation of the finder switch is effective for extending a connection from station S100 to finder-selector FS90. The selector switch of finder-selector FS90 is thereupon responsive to directive signals from station S100 and is advanced accordingly in its primary direction to the required level; the selector switch is then caused to hunt in its secondary direction to the terminals of an idle connector, C100, which is accessible from the level in which the switch is hunting. Upon location of such an idle connector, a connection is extended from station S100 to the connector, which is thereafter operative responsive to further directive signals from station S100. These further directive signals cause connector C100 to be advanced in its primary and secondary directions to multiple terminals of the called line circuit such as LC80. If the line circuit is idle, the connector seizes the line circuit by extending ground over sleeve conductor 919 to operate the cut-off relay 800 of line circuit LC80. Operation of relay 800 is effective to remove the connection of line relay 810 to conductor C601 of trunk TWT at contacts 801. The connector C100 thereafter signals the private branch exchange by intermittently extending alternating ringing voltage over the conductors of the seized line.

Assume that connector C100 has seized line circuit LC80 and is signaling in the above described manner over conductors C600 and C601 of the two-way trunk TWT which joins the, first, private branch exchange and, second, central offices. Ringing responsive means in the private branch exchange termination comprising ring-up relay 630 for controlling the energization of the incoming signal lamp LP12 is intermittently operated responsive to the application of ringing voltage extended to conductors C600 and C601; alternating ringing current flows through an obvious path including a full wave rectifier comprising rectifiers RCT600—RCT603, the winding of relay 630, and series capacitor C60 to intermittently energize the winding of relay 630. Ring-up repeater relay 300 is operated responsive to the operation of relay 630 by completion of a path for energizing the winding of relay 300 from ground at contacts 421, contacts 631 to the upper winding of relay 300. Relay 300 thereupon locks itself in operated condition over a path including ground at the lower winding of relay 300, contacts 304, 404 and 415 to night switching battery.

Incoming signal lamp is energized in a first, steady manner responsive to the operation of ring-up repeater relay 300 by completion of the circuit from night switching battery, contacts 411, 402 and 301 to lamp LP12 which appears in front of the operator at the private branch exchange, thereby indicating that a call is standing in on trunk TWT. Operation of relay 300 is also effective to mark the trunk termination as being busy to switching apparatus in the private branch exchange by extending ground from contact 309*b* through the break contact of make busy switch S30 to conductor 302 to the sleeve of all multiple appearances of the terminations to which finder-connector links, such as FC20 of the private branch exchange, have access. Also responsive to the operation of relay 300, supervisory repeater relay 700 is operated from ground extended from contacts 309 over conductor 315 to the winding of relay 700 for reasons that are explained presently.

Assuming that the operator position at the private branch exchange is attended, the operator answers the above-described incoming signal by inserting a plug such as the back plug P10 of the cord circuit CC10 in answering jack J10 of the trunk termination, thereupon completing a path for energizing back sleeve relay 120 and sleeve relay 400 from ground through the winding of relay 120, the sleeve conductor of plug P10 and jack J12, conductors 103, break contacts 416, and the upper winding of relay 400.

Operation of sleeve relay 400 is effective: to extinguish lamp LP12 by opening the above-described lamp energizing circuit at break contacts 402; to apply busy marking ground to conductor 302 at lamp contacts 506; to prepare a locking circuit for sleeve relay 400 at contact 505 by way of conductor C400; to prepare ring-up repeater relay 300 for release by opening the above-described locking circuit for relay 300 at contacts 404; and to trip the automatic ringing apparatus in the central office connector C100 by completing a loop circuit from central office battery through the winding of the well known ring trip relay in connector C100, conductor C601 of the two-way trunk TWT, the lower right-hand winding of repeat coil RPT40, break contacts 454 and 443, make contacts 403, break contacts 624, conductor C408, conductor C405, make contact 613, the lower, low resistance winding of supervisory relay 600, conductor 404, the upper right-hand winding of repeat coil RPT40, conductor 600 of two-way trunk TWT to the ground return in connector circuit C100. In connector C100, responsive to tripping the ringing, switching means disconnects the ringing apparatus from the above-described loop and substitutes a source of direct current from the well known, balanced answering bridge relay windings. Responsive to the removal of ringing current from the trunk TWT, ring-up relay 630 ceases to be intermittently operated and repeater relay 300 is thereupon released.

Supervisory relay 600 is operated responsive to the flow of direct current from the answering bridge relay in connector C100 through the above-described path which includes the lower winding of relay 600. Operation of relay 600 is effective to provide another ground for holding the supervisory relay repeater 710 in operated condition at contact 701, and to provide another busy marking ground to conductor 302 at contacts 702.

Also responsive to the insertion of the plug P10 into jack J10, a circuit is completed for operating both the supervisory relay 100 associated with plug P10 and line relay 430 at the trunk termination by placing the upper windings of each of the relays in series with the battery and the lower windings of each of the relays in series with the battery as follows: from ground through the upper winding of back supervisory relay 100 through the tip conductors of plug P10 and jack J10, conductor C101, conductor T2, break contact 627, conductor T1, break contacts 302 and 413, the upper left-hand winding of repeat coil RPT40, the upper winding of line relay 430 to battery; and from ground to the lower winding of line relay 430, the lower left-hand winding of repeat coil RPT40, break contacts 414 and 303, conductor R1, break contacts 625, conductor R2, conductors C102, the ring conductors of jack J10 and plug P10, the lower winding of back supervisory relay 100 to battery. It is pointed out that the exchange battery is connected to one side of each of the windings of the line and supervisory relays in such a manner that current flowing through both windings of either relay tends to cause the relay to operate. The amount of current flow in the windings of relays 100 and 430 under the above-described conditions is sufficient to operate both relays.

Operation of back supervisory relay 100 is effective to open the energizing circuit of supervisory lamp LP10 at break contacts 101 to prevent the energization of the supervisory lamp at this time.

Operation of line relay 430 is effective to provide an alternate path around break contacts 454 and 443 and make contact 403 in the above-described path for completing the supervisory loop of trunk TWT at contacts 431. Completion of the auxiliary path insures the holding of the loop under the control of the line relay. Operation of line relay 430 is also effective at make contacts 432 to complete an obvious energizing circuit for delay relay 440 which thereupon operates.

Operation of delay relay 440 is effective: to complete a high resistance path comprising the upper, high resistance winding of relay 600 which is parallel to the lower windings of relay 600 as follows: from the left-hand lead of the lower winding of supervisory relay 600, resistor R62, the upper, high resistance winding of supervisory relay 600, break contacts 623 and 452, make contacts 441 and 613 to the right-hand terminal of the lower winding of relay 600. Operation of relay 440 is also effective to complete the previously described locking circuit for the sleeve relay 400 at contacts 546; and to complete another busy marking ground to the sleeve conductor 302 at contacts 547.

A connection has now been completed from station S100 through the link equipment in the central office exchange to the operator telephone OP at the private branch exchange, and may be further extended from the operator position in the well known manner by plugging up the front plug of cord circuit CC10 to the station multiple jack J12 of the subscriber station S20 which appears before the operator. Signaling station S20 is accomplished by any of a number of well known methods by apparatus not shown. Battery is fed to the transmitter at the subscriber substation S20 from the balanced windings of supervisory relay associated with the plug of cord circuit CC10 inserted in jack J12.

In the above description of extending a connection from the central office station S100 to private branch exchange station S20, it is to be noted that the description has been confined to answering the incoming call at the private branch exchange operator position by means of the back plug P10 of the cord circuit CC10 and extending the call by inserting the front plug P11 in the multiple appearance jack J12 of the station called. It is pointed out that so far as the equipment disclosed is concerned, such a call may be extended by using the front plug P11 which may be inserted into answering jack J10 and back plug P11 which may be inserted in the station multiple jack J12 without altering the operation of the equipment shown in the termination Figs. 3–7.

At the conclusion of the call, release of the above-described connection can be effected by the return of the calling telephone at station S100 to its hookswitch, thereby effecting the release of the link equipment in the central office which is effective to release supervisory relay 600. Release of the central office link is effective to remove the ground extended over terminal 918 to release cut off relay 800 and restore line relay 810 to its previously described connection to conductor C601 of trunk TWT.

In the private branch exchange termination, release of the central office link is effective to open the circuits of supervisory relay 600, which thereupon releases to open the holding circuit of supervisory repeater relay 710 to release the latter. The operator at the position then removes the plug from jack J10 to disconnect the operator position from the termination and the line to which the connection has been previously extended. Delay relay 440 thereupon releases to release sleeve relay 400 by opening the previously described locking circuit at contact 546. The make busy ground connections to sleeve conductor C302 are removed responsive to the release of relays 400, 440 and 600 at contacts 506, 547 and 702, respectively, so that the termination is made available for seizure by the switch trains such as FC20 in the private branch exchange. The termination circuit is now in normal condition and ready for use on other incoming or outgoing calls to or from the private branch exchange office. A connection is thereby established between conductor C600 and wiper 910 of finder-selector link FS90.

*Extension of a call from private branch exchange station S20 to central office station S100.*—To originate a call at station S20, the telephone is removed from its hookswitch thereby energizing line circuit LC20 which in turn closes ground over the allotter start lead C200 to energize allotter AL20. Responsive to the energization of allotter AL20, the finder switch of an idle finder-connector link, such as FC20, is operated in its primary and secondary directions to advance the wipers, shown collectively as 201, to the multiple terminals of the calling line in the finder multiple. Such operation of the finder switch is effective for extending a connection from station S20 to the finder-selector link FS20. The connector switch of finder-connector link FC20 is thereupon responsive to directive signals from station S20 and is advanced accordingly in its primary direction to the required level; the connector switch, being of the connector-selector type, is caused to hunt in its secondary direction for an idle trunk responsive to its advance to the level in which trunks, such as the one shown in Figs. 3–7, appear. Upon location of such an idle termination, a connection is extended from station S100 to the incoming conductors shown collectively as C303 as is next described.

Upon location of an idle termination, finder-connector link FC20 is caused to cut-through so that a loop is completed for feeding direct current to the transmitter of the telephone at station S20 from the line relay 430 over the following, calling line loop: from ground, the lower winding of line relay 430, the lower left-hand winding of repeat coil RPT40, conductor 300, through the line loop comprising first talking conductors of the finder-connector link and the calling station line, the transmitter of the calling station telephone, back through second line conductors of the calling line and the finder-connector FC20, conductor C301, break contact 308, the upper left-hand winding of repeat coil RPT40, the upper winding of line relay 430 to battery. The line relay 430 operates responsive to the flow of current in the above traced calling line loop and is effective thereafter to function as a means for repeating directive signals originating at the calling station over the two-way trunk TWT to the central office equipment, an operation which will be presently described. Operation of line relay 430 is also effective to complete the seizure of the termination by causing the operation of delay relay 440 over an obvious circuit from ground at make contacts 432.

Operation of delay relay 440 is effective for extending a holding ground back to the finder-connector link FC20 to hold the latter operated under the control of the delay relay at make contacts 547 to the previously described make-busy conductor 302. A circuit is also completed for operating pulse delay relay from ground, contacts 546, break contacts 508, the break portion 563, off-normal contacts ON70, to the upper winding of the pulse delay relay which thereupon operates. Operation of delay relay 440 is also effective to operate trunk seizing means comprising shunt relay 450 from ground at break contacts 718, contacts 445 to the winding of shunt relay 450 to cause the latter to operate.

Operation of shunt relay 450 is effective to seize trunk TWT and to energize the central office termination, LC80, of the trunk in the following manner. Central office line relay 810 is operated over the following circuit: from ground through resistor R60, break contacts 614, make contacts 455, the lower right-hand winding of repeat coil RPT40, conductor C601 of two-way trunk TWT, break contact 801, the winding of line relay 810 to battery. Line relay 810 thereupon operates to extend ground from contacts 811 to common allotter start conductor C1000 to energize allotter AL100. Energization of allotter AL100 is effective to cause the latter to assign an idle finder-selector link, such as FS90, to search in the previously described manner for the terminations of the calling line (in this case, line circuit LC80) so that the wipers 910—913 of finder-selector link LS90 are caused to be extended to terminals 916—918 of line circuit LC80.

Responsive to the extension of conductor C600 of the two-way trunk TWT to the wiper 910 and the upper winding of the calling bridge relay 900 of the selector section of finder-selector link FS9, a circuit is completed from ground through the upper winding of the calling bridge relay 900, wiper 910 of the finder-selector FS9, conductor C600, the upper right-hand winding of repeat coil RPT40, resistor R62, the upper, high resistance winding of supervisory relay 600, break contacts 623, make contacts 453 on shunt relay 450, break contacts 615, resistor R61 to battery. The supervisory relay is thereupon operated to complete an obvious circuit for energizing supervisory repeater relay 710 at contacts 701.

Operation of relay 710 is also effective to pass back a holding ground over the lead C302 of the finder-connector link FC20 of the private branch exchange switching system at contacts C702 to hold the private branch exchange link in operated condition for the duration of the call.

Responsive to the operation of supervisory repeater relay 710, the operating circuits for line relay 810 and supervisory relay 600 are opened by removing the ground and battery connections to conductors C600 and C601 through resistors R60 and R61, respectively, at contacts 614 and 615, respectively.

Operation of relay 710 is also effective for establishing a holding connection for finder-selector link FS90 in the central office comprising the following path: from ground, the upper winding of calling bridge relay 900 in FS90, wiper 910, terminal 916, conductor C600 through the upper right-hand winding of repeat coil RPT40, the lower, low resistance winding of supervisory relay 600, make contact 613 on now-operated supervisory repeater relay 710, conductor C405, conductor C408, break contact 624, conductor C409, make contact 431, the lower right-hand winding of repeat coil RPT40, conductor C601, terminal 917, wiper 911, the lower winding of calling bridge relay 900 to battery. Enough current flows in the above traced trunk loop to hold calling bridge relay 900 operated. Operation of relay 900 causes link FS90 to pass back ground over the wiper 912 and terminal 918 to operate cut-off relay 800 in line circuit LC80. Operation of relay 800 is effective to remove the connection of the line relay 810, which was previously described, to conductor C601, thereby completing the seizure operation of the finder-selector link in the central office.

Returning to the operation of delay relay 440 in the private branch exchange termination of trunk TWT, it is to be noted that operation of the latter relay is effective to operate pulse delay relay 560 by extending ground from make contacts 546, break contacts 508, break contacts 563, conductor C505, break contact ON70, the upper winding of pulse delay relay 560 to battery. Operation of delay relay 440 is further effective to establish the previously described high resistance secondary circuit for the upper winding of relay 600 around the latter's lower, low resistance winding.

Responsive to the operation of pulse delay relay 560, the above described operating circuit for shunt relay 450 is opened at contact 562 so that the shunt relay thereupon releases. A locking circuit for the pulse delay relay is established over the following path: from ground at make contact 546, make contacts 564, break contacts ON70 to the upper winding of the pulse delay relay whereby the pulse delay relay is held operated independently of the operation of the first and second delay repeater relays 410 and 420, respectively.

Operation of pulse delay relay 560 is effective for completing an operating circuit for the first delay repeater relay 420 from ground at make contacts 717, make contacts 566, break contact **519*a*, break contact 524 of the make-before-break combination on the first delay repeater relay to the upper winding of the first delay repeater relay. Operation of the pulse delay relay 560 is also effective for preparing a holding circuit for itself, whereby relay 560 is held operated during pulsing at contacts 565**. This circuit is more fully explained later in this description.

Responsive to the operation of first delay repeater relay 420, a locking circuit for the latter is completed to hold relay 420 operated independent of the operation of the supervisory repeater, pulse delay, and second delay repeater relays at contacts 525 from ground at make contacts 546. A circuit for operating second delay repeater relay 410 is completed responsive to the operation of relay 420 from ground at contacts 526. Operation of relay 420 is also effective to provide an additional holding ground to conductor 302 at make contact 528.

Responsive to the operation of second delay repeater relay 410, a locking circuit for the latter relay is established from ground at make contacts 717, 566 and 519 to hold the second delay repeater relay operated during the time that the pulse delay repeater and supervisory repeater relays 560 and 710 are operated. Also responsive to the operation of relay 410: a busy test ground is extended to the sleeve of answering jack J10 from break contacts 629, conductor G, make contact 417, conductor C103 to the sleeve conductor of jack J10; the talking path leading from the private branch exchange side of repeat coil RPT40 to the talking conductors 101 and 102 which are connected to the jack appearance of the termination in front of the operator position are opened at break contacts 413 and 414, thereby preventing an operator from establishing a connection between the private branch exchange position and the termination during the time that the termination is seized from the selector bank access. After second delay repeater relay 410 has operated, the termination is then in condition to receive switch directing signals from the private branch exchange station S20 for repetition to the seized central office switching link.

Signals from station S20 are transmitted to the termination shown in Figs. 7–9 for repetition in the standard manner by opening and closing at the station dial the above described calling line loop in which the windings of line relay 430 are included; line relay 430 which follows the dial signals repeats such signals to the central office switch train by opening and closing the short comprising the lower, low resistance winding of supervisory relay between conductors C600 and C601 at contacts 431. The opening and closing of conductors C600 and C601 in turn causes the calling bridge relay 900 in central office finder-selector link FS90 to follow the repeated impulses, and, by so following, to step the switches of the link to the level represented by the number of repeated impulses in the train of impulses. Delay relay 440, being a slow release type, is held operated during any such pulse-repeating operation.

In response to the first release of line relay 430 when the latter is being pulsed by a train of impulses sent into the private branch exchange termination of trunk TWT, a circuit is established for operating shunt relay 450 from ground at contacts 433, contacts 445 to the winding of shunt relay 450. Operation of shunt relay 450 is effective to short out the upper right-hand winding of repeat coil RPT40, the windings of supervisory relay 600, and capacitor C41, by establishing a connection from conductor C600 through contacts 611, 451, 624 and 431 to the lower right-hand winding of repeat coil RPT40, thereby reducing the impedance of the loop of trunk TWT during pulsing. Relay 450, being of the slow release type, is held operated during the remainder of the pulsing, including the periods when line relay 430 is reclosed and for an interval equal to the release time of relay 450 after pulsing of relay 430 stops. During the time that relay 450 is operated, a holding circuit for supervisory repeater 710 is established from ground at make contacts 456 and 715 to the winding of the supervisory repeater relay to hold the latter operated in the event that supervisory relay 600 is released during pulsing. Release of shunt relay 450 is effective to re-establish the upper right-hand winding of repeat coil RPT40 in its previous position in the loop of the trunk circuit.

In response to the first train of impulses repeated at line relay 430, the registration means comprising minor switch M70 is effective to record the number of impulses in the train by being advanced one step for each release of relay 430 over the following circuit: from ground at break contact 433, make contact 423, make contact 565 to the stepping magnet M71. The reoperation of line relay at the conclusion of each impulse release, magnet M71 advances the wiper W70 one step. Thus the position in which minor switch M70 is left at the conclusion of a train of repeated impulses represents the number of impulses in the train. Holding of the pulse delay relay after the minor switch has been stepped from its normal position and the operating circuit of relay 560 is opened at off-normal springs ON70 is insured by energizing the lower winding of relay 560 from pulsed ground from the same source as for stepping magnet M71 by way of contacts 565. At the conclusion of the repeating of train of impulses by line relay 430, the line relay comes to rest in its operated position and the above described energizing circuit for magnet M70 and the holding circuit for pulse delay relay 560 are opened for a sufficient interval to allow pulse delay relay 560 to release. Responsive to the release of pulse delay relay 560, further stepping of switch M70 is made impossible (except as hereafter noted) in response to further impulsing of line relay 430, since the energizing circuit of magnet M71 is opened at contacts 565, and the operating circuit of relay 560 cannot be re-energized because it is held open at off-normal contacts ON70.

In the event that the calling station S20 has dialed a restricted level in a central office finder-selector link such as FS90, the registering means is operative to energize the discriminating means in the private branch exchange termination of trunk TWT by extending ground from break contact J111 on jack J11, conductor C104, make contact 534, wiper W70 of the minor switch, conductor C700, which is connected to the terminal of the minor switch bank, the winding of discriminating relay 720 to battery. Relay 720 operates M70 which represents the number of impulses in a first impulse train that are required to step finder-selector link FS90 at the restricted level.

Operation of discriminating relay 720 is effective to establish a holding circuit for itself to insure the holding of the discriminating relay so long as the termination is held by calling station S20 from ground at contacts 546 on delay relay 540 and contacts 729*b*. The previously mentioned busy indicating ground extended to the sleeve conductor of jack J10 at contacts 629 is removed and a connection is extended from the sleeve conductor C103 to the upper winding of sleeve relay 400, from make contact 417, conductor G, make contact 629*a*, conductor SL, to the upper winding of sleeve relay 400 for reasons to be explained subsequently. The talking conductors C101 and C102 are transferred from their normal connection to the break contacts 302 and 303, respectively, on ring-up repeater relay 300 to conductors C300 and C301, respectively, of the incoming termination at contacts 626 and 627 of discriminating relay 720.

Operation of discriminating relay 720 also is effective to render further impulsing of line relay 430 and to release the trunk TWT and the previously seized link such as FS90 by opening the loop of trunk TWT at break contact 624.

Subsequent to the opening of the loop of trunk TWT and the resulting release of the central office link equipment, supervisory relay 600 and supervisory repeater relay 710 are released. In order to prevent an incoming call from being extended from the central office to the private branch exchange termination of trunk TWT during the time that a call to a restricted central office level is being intercepted, the equipment in the termination is arranged to reseize the central office line termination LC80 during the intercept period as follows: a circuit for operating shunt relay 450 is re-established from ground at break contacts 718 and make contacts 445 to operate the shunt relay. Operation of shunt relay 450 is effective to extend ground through resistor R60, break contacts 614, make contacts 455, the lower right-hand winding of repeat coil RPT40 to reoperate line relay 810 in line circuit LC80 in the previously described manner. The central office equipment is next energized in the previously described manner to assign an idle finder to the calling line circuit LC80, such as finder-selector link FS90, and in the manner previously described. Following the extension of the connection from line circuit LC80 to the line termination, ground connection to sleeve terminal 918 is established for operating cut-off relay 800 in line circuit LC80 and also serves to mark the line circuit LC80 as busy to all switching apparatus in the central office during the time that an intercepted call through the termination shown in Figs. 3–7 is in progress.

Operation of discriminating relay 720 is also effective to apply an audible signal to the calling telephone of station S20 to indicate that the call is intercepted by applying ring-back tone from conductor C603, make contact 622, contact 405, capacitor C30, contact 303, conductor C301, thence over the loop of the calling subscriber line, back over conductor C300 to the lower left-hand winding of repeat coil RPT40 and the lower winding of line relay 430 to ground. A circuit for energizing lamp LP12 in front of the operator position in a second particular manner, namely, 120 flashes per minute, is completed by the operation of discriminating relay 720 from the 120 IPM source, conductor C604, contacts 621, 401, lamp LP12 to ground.

In response to the energizing of signal lamp LP12 in the above described second manner, the operator inserts a plug of cord circuit CC10 into answering jack J10 thereby extending the connection from the calling subscriber telephone station S20 to the operator telephone OP by way of make contacts 626 and 627 on the discriminating relay 720. The supervisory relay associated with the plug inserted in jack J10, such as relay 100 (associated with plug P10), is bridged across the talking conductors of the telephone connection described above with its windings in reversed relationship to the previously explained series relationship with the windings of line relay 430, so that the supervisory relay is grounded, upper winding is in parallel with the lower, grounded winding of line relay 430 and the lower, battery winding of supervisory relay is in parallel with the upper, battery winding of relay 430. Direct current for the transmitter at the calling station S20 is supplied over the previously described calling loop which includes the transmitter and talking conductors of the telephone station line and private branch exchange link talking conductors from the windings of both the supervisory relay in cord circuit CC10 and line relay 430 in the private branch exchange termination. As a result of current flowing through them, the supervisory relay and line relay both are held operated during the time that the telephone at station S20 is held off-hook.

Responsive to answering an intercepted call at the operator position by insertion of a plug of cord circuit CC10 in answering jack J10, a circuit is completed from ground through the winding of the sleeve relay 120 of the cord circuit's CC10, the sleeve conductor of plugs P10 and jack J10, conductor C103 to the above described path to the upper winding of sleeve relay 400. Sleeve relays 120 and 400 thereupon operate. Operation of relay 400 completes for relay 400 a holding circuit from ground, make contacts 546 and 505 to its lower windings, and is also effective to open the above described second energizing circuit for lamp LP12 at contacts 401. Operation of cord sleeve relay 120 is effective to partially complete the circuit for energizing supervisory lamp LP10; control of supervisory lamp LP10 is now under the control of break contacts 101 of supervisory relay 100. Relay 100 (as well as line relay 430) are held operated so long as the telephone at the calling station S20 is held off-hook. When the telephone is hung up, relay 100 releases to complete the energizing circuit for lamp LP10 to indicate the completion of the call. The operator may withdraw from the connection at any time during the intercept call by removing the plug from jack J10, leaving sleeve relay 400 locked up from ground supplied at contacts 546 and 505 to its own lower winding.

Assuming next that the first digit repeated at the private branch exchange termination of trunk TWT shown in Figs. 3–7 is one which represents a level of finder-selector FS90 which is unrestricted to calling stations in the private branch exchange, it is now shown how the registering and restricting means is arranged so that succeeding trains of impulses after the first unrestricted digit are transmitted to the central office without interference caused by the registering and discriminating means. Following the registration of a first, unrestricted digit, minor switch M70 in the above described manner, following the repetition of the first train of impulses, pulse delay relay 560 is de-energized and releases as previously described. In this case, however, the operating circuit for the discriminating relay is not completed since the terminal to which the wipers W70 of minor switch M70 is stepped is not connected to conductor C700 so that the discriminating relay is not operated, and the repeating means in the termination comprising line relay 430 remains operative to hold trunk TWT seized and hold the central office switch train in its operated position by maintaining the short between conductors C600 and C601 of trunk TWT. Further trains of switch directing impulses are repeated into the central office switch train by interrupting the loop of trunk TWT in the previously described manner. Minor switch M70 remains in operated condition for the duration of the call, and holds open the operating circuit of pulse delay relay 570 at contacts ON70.

In the event that the first digit repeated at the terminating means directs the central office switch train comprising finder-selector FS90 to a level which is unused and that the finder-selector link is equipped with means to cancel such a digit upon its receipt, conductor C701 is connected to the terminals of minor switch M70 which correspond to the number of impulses required to direct the central office switch to such a level. Responsive to registration of such a canceled digit, a first releasing circuit for restoring minor switch M70 to normal is completed from ground at break contacts J111, conductor C104, make contacts 534, the shorting sector of minor switch M70, conductor C701, conductor C501, contact 564, off-normal contact ON71, magnet M72 to battery. Operation of release magnet M70 causes wiper W70 and off-normal switches ON70 and ON71 to be released to their normal positions; the circuit for operating pulse delay relay 570 is thereupon re-established at contacts ON70 to reoperate the latter relay in preparation for registering the value of the next train of impulses. Continued repetition of a canceled level train of impulses is effective to clear the registering means by causing minor switch M70 to release in the manner described at the conclusion of registration of each such digit on the minor switch.

Following the establishment of the required connection between private branch exchange station S20 and central office station S100 in response to the dialing of digits by station S20, the circuit may be released by restoring the station telephone to its hookswitch to open the above described line loop in which line relay 430 is connected in series with battery and ground. Line relay 430 thereupon releases for an interval sufficient to cause the release of the delay relay 440. Release of line relay 430 is effective to re-establish a momentary operating circuit for shunt relay 450 at contacts 433 and 445 which is again opened as soon as delay relay 440 releases in the above described manner. Operation of shunt relay 450 is without practical effect at this time. Release of delay relay 440 is effective to open the holding circuit of first delay repeater relay 420 at contacts 546. The first delay repeater relay thereupon releases opening the above described circuit of second delay repeater relay 410 which thereupon releases at contacts 526.

The central office switching equipment is released by opening the loop of trunk TWT at make contacts 431 on line relay 430. Subsequent to the opening of the loop to the switch train, the central office switch train is released to restore the central office links to normal condition. Release of the central office equipment is operative to open the operating and holding circuits of supervisory relay 600 to release trunk TWT by opening the operating and holding circuits of supervisory repeater relay 710 at contacts 701. Both relays release, leaving trunk TWT and the termination shown in Figs. 3–7 in normal condition and ready to receive incoming or outgoing calls to the private branch exchange.

*Extension of a call from the operator position at the*

*private branch exchange to a central offie station.*—To originate a call, the operator at the position in the private branch exchange station inserts the plug of a cord circuit such as plug P10 of cord circuit CC10 in answering jack J10 of the termination of trunk TWT. Insertion of the cord circuit plug in jack J10 serves to operate supervisory relay associated with the inserted plug in the cord circuit relays 430, 440 and 400 of the trunk termination in the manner described in connection with an incoming call from the central office. Seizure of trunk TWT and the line termination LC80 at the central office takes place in the manner described in connection with calls outgoing to the central office from station S20 by the operation of relays 450, 600 and 610 to establish a calling condition in the central office to cause an idle link circuit such as finder-selector FS90 to be assigned to the calling line for further direction. Upon the assignment of an idle link to the calling line LC80 at the central office, the operator transfers control of line relay 430 to the dial D100 by throwing key K10 to transfer the talking conductors of plug P10 from their normal connection to the supervisory relay associated with the inserted plug to a connection with the dial D100 contacts which are placed directly across the calling conductors of the cord at contacts K101 and K102. It is to be noted that the operating circuit of pulse delay relay 560 fails to operate at this time because the previously described energizing circuit for its winding is opened at the contact 508 of sleeve relay 400. Subsequent pulsing of the dial contacts D100 and the following of such pulses by line relay 430 is effective to repeat impulses from dial D100 at contacts 431 and ineffective to step the minor switch M70 because pulse delay relay 570 is in normal condition. Because the registering means is inoperative on calls originating at the operator position, the discriminating means comprising relay 720 is likewise inoperative. As a result, connections may be extended from the operator position to any of the levels accessible to the central office switching equipment regardless of the restricted or unrestricted nature of the level being called.

*Night service switching*

When it is desired to leave the operator position unattended in the private branch exchange and at the same time provide incoming and outgoing service for certain of the stations, such as S20 which are associated with the private branch exchange, the attendant inserts one plug, such as P13 of patching cord PC10, into the night answering jack J11 to extend a connection from the station telephone in the well known manner to the talking conductors of the patching cord PC10. The other plug of the patching cord, such as P12, is then inserted in the night service jack J11 to further extend the connection from station S20 to conductors C105 and C106 of the termination in the private branch exchange. Insertion of the plug in jack J11 is operative to cause contacts J112 to be connected to ground, and ground to be removed from contacts J111 which, as is apparent from the above described operation of the discriminating relay 720, is essential to completing the operating circuit for the latter relay. Consequently, the discriminating means associated with the private branch exchange termination is thereby disabled during the time that the patching connection for night service is established so that a connection from a calling station in the private branch exchange may be extended to the restricted and unrestricted central office levels alike since directive signals from the calling station are repeated by line relay 430 in the manner described in connection with outgoing calls from station S20 without interference from the now inoperative restricting means comprising relay 720.

While I have shown and described a specific embodiment of my invention, other modifications will readily occur to those skilled in the art. I do not, therefore, desire my invention to be limited to the specific arrangement shown and described, and I intend in the appended claims to cover all modifications within the spirit and scope of my invention.

What is claimed is:

1. In a telephone system, a first office and a second office connected by a two-way trunk, a termination in said first office for said two-way trunk comprising incoming signaling means and registering means, means in said second office for seizing said trunk, means in said termination responsive to seizure of said trunk by said second office means for energizing said incoming signaling means in a first manner, a telephone comprising a signaling device associated with said first office, means comprising said telephone for seizing said termination, means responsive to seizure of said termination by said telephone means for seizing said trunk, said repeating means thereafter being effective for repeating directive signals from said signaling device to said trunk, said registering means being responsive to operation of said repeating means, and discriminating means responsive to said registering means for energizing said incoming signaling means in a second particular manner.

2. The device set forth in claim 1, wherein said discriminating means is also effective in response to said registering means for sending back a distinctive tone to said telephone.

3. In a telephone system, a first office and a second office connected by a two-way trunk, a termination in said first office for said two-way trunk comprising incoming signaling means and registering means, means in said second office for seizing said trunk, means in said termination responsive to seizure of said trunk by said second office means for energizing said incoming signaling means in a first manner, a telephone comprising a signaling device associated with said first office, means comprising said telephone for seizing said termination, means responsive to seizure of said termination by said telephone for seizing said trunk, means for thereafter repeating directive signals from said signaling device to said trunk, registering means responsive to operation of said repeating means, and discriminating means responsive to said registering means for releasing said trunk and for energizing said incoming signaling means in a second manner.

4. The device set forth in claim 3 wherein said discriminating means is also effective responsive to said registering means for rendering said repeating means inoperative to repeat further signals transmitted from said signaling device.

5. In a telephone system, a first office and a second office connected by a two-way trunk, a termination in said first office for said two-way trunk comprising registering means, means in said second office for seizing said trunk and for extending a connection from said second office, a telephone comprising a signalling device associated with said first office, means comprising said telephone for seizing said termination, means responsive to seizure of said termination by said telephone for seizing said trunk, means in said termination for thereafter repeating directive signals from said signaling device to said trunk, registering means responsive to the operation of said repeating means, and discriminating means responsive to said registering means for releasing said trunk, and for thereafter rendering said seizing means effective to re-seize said trunk to prevent seizure of said trunk by said second office seizing means.

6. In a telephone system, a first office and a second office connected by a trunk, a termination for said trunk in said first office, a telephone comprising a signaling device associated with said first office, means comprising said telephone for seizing said termination, means responsive to seizure of said termination for seizing said trunk, means thereafter effective for repeating signals from said signaling device over said trunk, means in said termination for registering the value of at least the first of a plurality of directive signals repeated by said repeating means, discriminating means operated responsive to the registration in said registering means of a first directive signal of a particular value for releasing said trunk and rendering said repeating means thereafter ineffective.

7. In a telephone system, a first office and a second office connected by a two-way trunk, a termination for said trunk in said first office, means in said second office for seizing said trunk, a telephone comprising a signaling device associated with said first office, means comprising said telephone for seizing said termination, means in said termination for seizing said trunk, means responsive to seizure of said termination by said telephone for rendering said seizing means effective and for repeating signals from said signaling device over said trunk, means associated with said termination for registering the value of at least a first of a plurality of directive signals repeated by said repeating means, discriminating means operated responsive to the registration in said registering means of a first directive signal of a particular value for releasing said trunk, for rendering said repeating means thereafter ineffective and for rendering said trunk seizing means effective to re-seize said trunk to prevent seizure of said trunk by said second office seizing means.

8. In a telephone system, a trunk, a termination for said trunk including repeating means, said repeating means comprising a line relay for repeating directive signals over said trunk, an operator position comprising a supervisory relay, each of said relays having first and second windings, a source of potential, a telephone, means for extending a connection from said telephone to said termination and for connecting said telephone in series with said line relay windings and said potential source to energize said telephone and to operate said line relay, registering means operative responsive to operation of said repeating means, discriminating means operative responsive to operation of said registering means for rendering said repeating means inoperative, means for extending a connection from said operator position to said termination, said operator position connection extending means and said discriminating means for jointly controlling the connection of each of said supervisory relay windings in parallel with a corresponding winding of said line relay to operate said supervisory relay in parallel with said line relay, said operator position extending means actuated independently of said discriminating means being effective for connecting said each of said supervisory relay windings in series with the other, non-corresponding winding of said line relay and said potential source to operate said line and said supervisory relays.

9. In a telephone system, a line relay, a supervisory relay, each of said relays comprising first and second windings, a telephone, a potential source, means for connecting said telephone in series with each of said line relay windings and said potential source to energize said telephone and to operate said line relay, means operative responsive to the operation of said telephone connecting means for connecting each of said supervisory relay windings in parallel with a corresponding winding of said line relay to operate said supervisory relay in parallel with said line relay, and other means operative independently from said telephone connecting means for connecting each of said supervisory relay windings in series with the other, non-corresponding winding of said line relay and said potential source to operate said line and said supervisory relays.

10. In a telephone system, a trunk, a termination for said trunk comprising a line relay for repeating directive signals over said trunk, an operator position comprising a supervisory relay, each of said relays having balanced first and second windings, a potential source, a telephone, means for extending a connection from said telephone to said termination and for connecting said telephone in series with said line relay windings and said potential source to energize said telephone and to operate said line relay, means for extending a connection from said operator position to said termination, other means jointly responsive to the operation of said telephone connecting means and said means for extending a connection from said operator position to said termination for connecting each of said supervisory relay windings in parallel with a corresponding winding of said line relay to operate said supervisory relay in parallel with said line relay, said means for extending a connection from said operator position to said termination being effective independent of said telephone connecting means for connecting each of said supervisory relay windings in series with the other, non-corresponding winding of said line relay and said potential source to operate said line and said supervisory relays.

11. In a telephone system, a first office and a second office connected by a trunk, a termination for said trunk in said first office, a telephone comprising a signaling device associated with said first office, means comprising said telephone for seizing said termination, means for seizing said trunk, means responsive to seizure of said termination for rendering said seizing means effective and for thereafter repeating signals from said signaling device to said trunk, means associated with said termination for registering the value of at least a first of a plurality of directive signals repeated by said repeating means, discriminating means operated responsive to the registration in said registering means of a first directive signal of a first particular value for releasing said trunk and rendering said repeating means thereafter ineffective, first relasing means responsive to the registration in said registering means for a first directive signal of a second particular value for clearing said registering means and for rendering said registering means thereafter responsive to said repeating means.

12. In a telephone system, a first office and a second office connected by a trunk, a termination for said trunk in said first office, a telephone comprising a signaling device associated with said first office, means comprising said telephone for seizing said termination, means in said termination for seizing said trunk, means responsive to seizure of said termination by said telephone for rendering said seizing means effective and thereafter for repeating signals from said signaling device to said trunk, means associated with said termination for registering the value of at least a first of a plurality of directive signals repeated by said repeating means, discriminating means operated responsive to the registration in said registering means of a first directive signal of a first particular value for releasing said trunk and for rendering said repeating means thereafter ineffective, and means effective subsequent to the registration of a signal in said registering means for preventing said registering means from thereafter responding to said repeating means.

13. In a telephone system, a first office and a second office connected by a two-way trunk, a termination for said trunk in said first office, means in said second office for seizing said trunk, a telephone comprising a signaling device associated with said first office, means comprising said telephone for seizing said termination, means in said termination for seizing said trunk, means responsive to seizure of said termination for rendering said seizing means effective and for thereafter repeating signals from said signaling device to said trunk, means associated with said termination for registering the value of at least the first of a plurality of directive signals repeated by said repeating means, discriminating means operated responsive to the registration in said registering means of a first directive signal of a first particular value for releasing said trunk and for rendering said repeating means thereafter ineffective to repeat further directive signals, first releasing means operated responsive to the registration in said registration means for first and subsequently repeated directive signals of a second particular value for clearing said registering means and for rendering said registering means thereafter responsive to subsequent directive signals, and means responsive to the registration in said registering means of a signal of other than said second particular value effective subsequent to the registration in said registering means for preventing said registration means thereafter from further responding to said repeating means.

References Cited in the file of this patent

UNITED STATES PATENTS

| | | |
|---|---|---|
| 2,335,481 | Boswau | Nov. 30, 1943 |
| 2,518,210 | Wicks | Aug. 8, 1950 |
| 2,520,130 | Deakin | Aug. 29, 1950 |
| 2,592,784 | Bakker | Apr. 15, 1952 |
| 2,682,577 | Hutton | June 29, 1954 |
| 2,691,069 | Frankel | Oct. 5, 1954 |

UNITED STATES PATENT OFFICE

CERTIFICATE OF CORRECTION

Patent No. 2,813,930

November 19, 1957

William H. Berch

It is hereby certified that error appears in the printed specification of the above numbered patent requiring correction and that the said Letters Patent should read as corrected below.

Column 15, line 1, for "offie", italicized, read --office--, italicized; column 18, line 34, for "relasing" read --releasing--; line 35, for "means for" read --means of--.

Signed and sealed this 11th day of February 1958.

(SEAL)
Attest:

KARL H. AXLINE

Attesting Officer

ROBERT C. WATSON
Commissioner of Patents